Dec. 10, 1957 W. S. McDOWALL 2,816,208
ELECTRIC WELD TUBE MILLS INSIDE SPREADING ROLLS AT ELECTRODE
Filed March 30, 1956 2 Sheets-Sheet 1
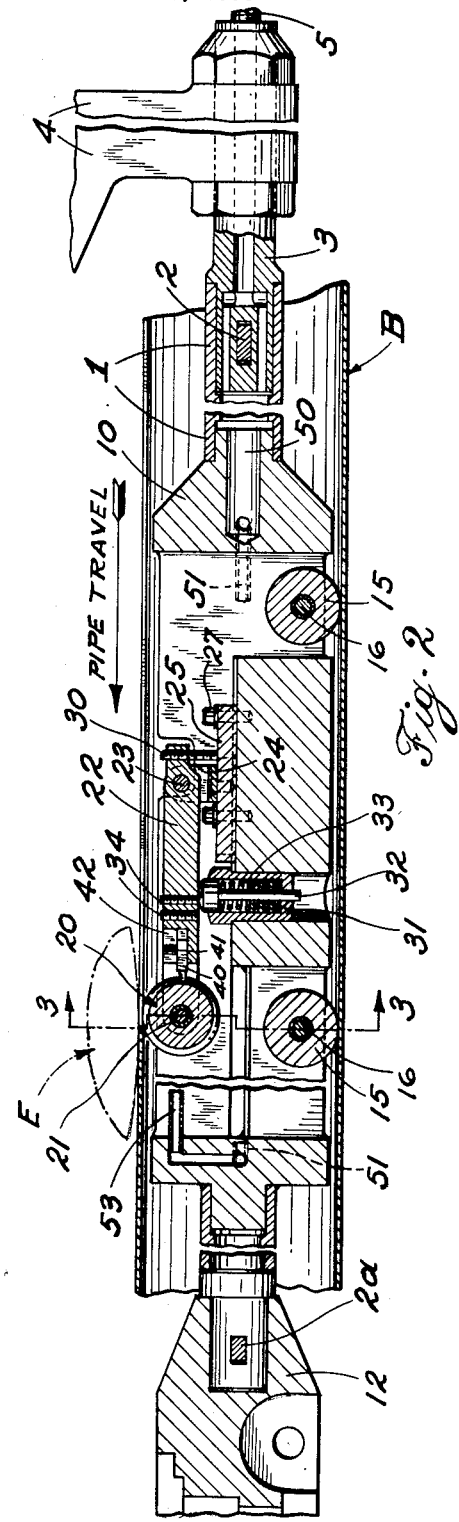
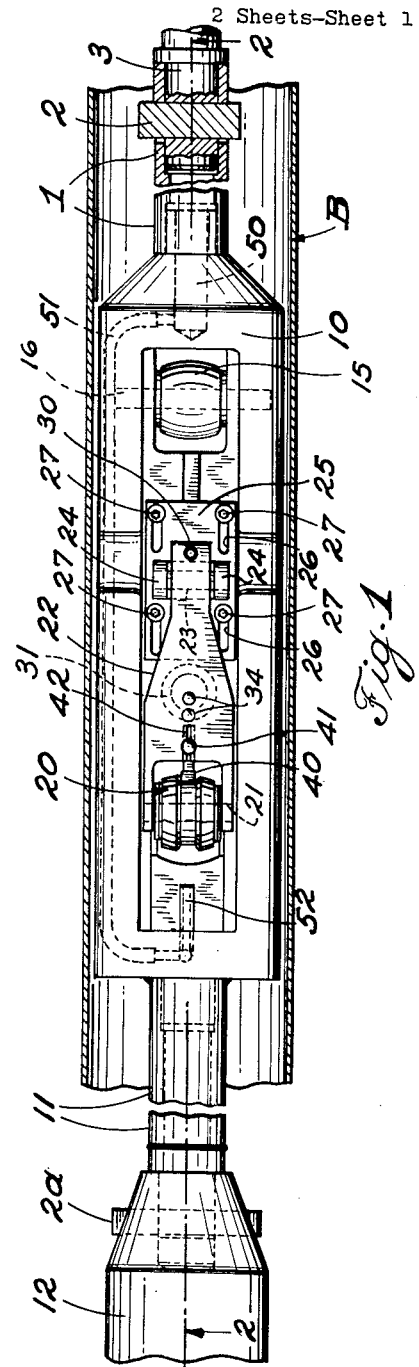
INVENTOR.
WILLIAM STEWART McDOWALL
BY
RICHEY, WATTS, EDGERTON & McNENNY
A.D. Watts
ATTORNEYS Dec. 10, 1957 W. S. McDOWALL 2,816,208
ELECTRIC WELD TUBE MILLS INSIDE SPREADING ROLLS AT ELECTRODE
Filed March 30, 1956 2 Sheets-Sheet 2

INVENTOR.
WILLIAM STEWART McDOWALL
BY
RICHEY, WATTS, EDGERTON & McNENNY
B.D.Watts
ATTORNEYS

United States Patent Office 2,816,208
Patented Dec. 10, 1957

2,816,208

ELECTRIC WELD TUBE MILLS INSIDE SPREADING ROLLS AT ELECTRODE

William Stewart McDowall, Youngstown, Ohio, assignor to Republic Steel Corporation, Cleveland, Ohio, a corporation of New Jersey Application March 30, 1956, Serial No. 575,241

6 Claims. (Cl. 219—59)

This invention relates to the art of electric resistance welding tubular blanks to tubes or pipes and is particularly concerned with new and novel apparatus for supporting the blank in the welding zone against the forces applied thereto by the welding electrodes.

Heretofore in resistance welding together the opposed, longitudinally extending edges of a tubular blank, apparatus has been used within the blank to support the portions thereof adjacent to the opposed edges. Because of the need for maintaining close tolerances it has been necessary heretofore to make such an apparatus for each of the many different sizes of tubing being welded. Many efforts have been made to provide apparatus for this purpose which could be made adaptable to a substantial range of blank sizes, but no entirely satisfactory apparatus has been devised heretofore to that end.

The present invention provides apparatus for use within a blank which, by replacing a few parts and making certain adjustments, may be used with blanks of several different diametrical sizes, wall thicknesses and physical strengths.

The present invention will be better understood by those skilled in the art from the following specification and the drawings accompanying it in which:

Fig. 1 is a top plan view of apparatus embodying the present invention;

Fig. 2 is a vertical longitudinal sectional view taken on line 2—2 of Fig. 1 and showing the apparatus in a blank to be welded;

Figure 3:
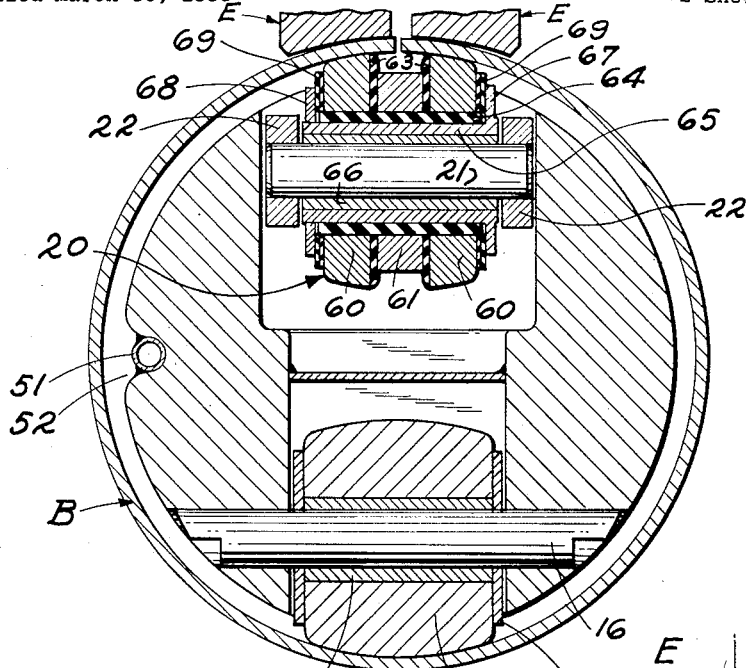
Fig. 3 is a transverse sectional view taken on line 3—3 of Fig. 2.

The apparatus of Fig. 1 is to be positioned within a tube or pipe blank B substantially in the position shown in Fig. 2. That apparatus, which may be referred to as a mandrel, comprises an elongated member which is preferably in the form of a tube, a plug and rolls. At one end the elongated member 1 is connected, as by key 2, or in any other suitable manner, to a fitting 3 which in turn is connected to a bracket 4 which may be secured to a part of the welder (not shown), and the fitting may be in communication with a source of water supply (not shown) through pipe 5. It will be understood that bracket 4 extends out of the tube blank between the opposed longitudinal edges of that blank in advance of the welding throat or zone and serves to position the mandrel of Fig. 1 within the tube blank.

At its trailing end, member 1 is connected to a plug 10 and at its trailing end plug 10 is connected to another elongated member 11, preferably a tube, which at its trailing end may be connected to a trailing roller carriage 12, as by a key 2a which may be like key 2.

The plug 10 is provided with two rollers 15 projecting from one side thereof to engage the inner surface of the blank opposite the longitudinal edges of the latter. As is shown in Fig. 3 these rollers 15 are composed of metal and are mounted on shafts 16 which are removably secured in the plug. It is to be noted that these rollers have bearings 17 which rotate on the shaft 16 and other bearings 17a between the ends of the rollers 15 and the adjacent parts of the plug 10.

A roller 20 is supported by, but insulated from, an axle 21 which is removably secured in a roll carrier 22. This carrier is rotatably mounted on an axle 23 which is fixed in brackets 24 which are integral with a plate 25. This plate is provided with a plurality of elongated cap screw receiving holes 26. Cap screws 27 extend through these holes 26 and into the plug 10 and serve as means for adjustably positioning roll 20 longitudinally of the plug and of the blank. A set screw 30 threaded through the leading end of roll carrier 22 bears against the top surface of the plate 25 and serves as a means for limiting the upward, that is, radially outward, movement of roll 20. Plug 10 is fitted with a spring receiving cup 31 in which a plunger 32 is urged outwardly by spring 33. This plunger 32 is engageable with one or both of set screws 34 in roll carrier 22. Plunger 32 urges roll carrier 22 outward radially of the tube blank, the extent of such movement being determined by the adjustments of cap screws 30 and 34.

Thus it will be understood that roll 20 may be moved longitudinally of the blank B and plug 10 and may also be moved radially of the blank.

Roll carrier 22 is provided with a recess in which a cutting or scraping tool 40 is secured as by set screw 41. The trailing end of tool 40 is engageable with the middle disc of roll 20 as will be described in more detail hereinafter. A narrow slot 42 extends through the carrier 22 above tool 40 and affords access for a thin tool to adjust the position of tool 40 relative to the roll 20.

The interior of the member 1, when it is tubular, is connected to a rearwardly extending tubular outlet 50 by a conduit 51 which extends laterally from the leading end of plug 10, thence along a recess 52 in the plug to the trailing end of the plug where it communicates with tubular outlet 53. The purpose of this conduit 51 is to conduct cooling fluid, such as water, from the leading end of member 1 to the trailing end of the plug 10 where the liquid may be discharged against roll 20 for the purpose of controlling its temperature and cooling and preventing adherence of metal spittings from the blank at the place of welding.

It will be noted from Fig. 2 that the trailing roller 15 has a center of rotation in the vertical plane of the center of the electrodes E and that the axis of rotation of roll 20 is in a vertical plane a short distance in advance of the center line of the electrodes. This relative positioning of rollers 15, 20 and electrodes E is important for several reasons and varies with differences in wall thickness and diameter of the blank, the physical properties of steel of the blank, the desired intensity of the current and the need for support for the edge portions of the blank just ahead of the vertical plane of the electrode axes.

Generally speaking the thicker the wall of the blank, the farther the center of roller 20 is placed ahead of the electrode center line plane since the force required to hold the skelp in position becomes greater as the wall thickness increases. As the required force increases, the leverage of the unsupported skelp is increased to afford sufficient force for the purpose.

The diameter of the blank also has an effect on the force and distance variations since the smaller the diameter for a given wall thickness the stiffer is the blank.

The strength of the skelp is a factor because the higher the strength the more resistant is the skelp to change of position.

The density of the current per square inch may be varied by varying the area of contact of the skelp with the electrodes and this area may be varied by shifting the location of roller 20. The farther it is ahead of the electrode center line, the more will be the area of contact. By shifting roller 20, electrode burns on the surface of the pipe may be eliminated.

The relative position of roller 20 effects the welding zone since the weld is formed just ahead of the plane of the electrode center line and since the roller may support the edge portions of the blank for different distances ahead of the place of welding and may thus prevent "caves", i. e., depressed or misaligned edge portions at the weld.

Figure 5:
Fig. 5 is an enlarged, fragmentary view showing the relative positions of the electrodes and blank immediately ahead of the place of welding.

In the illustrated modification the distance between the vertical planes of the center lines of the electrodes and the roller 20 is ¾″ and the diameter of blank B at that place of welding is 12¾″. By reason of this location of roll 20, the longitudinal edges of the blank are supported and urged outwardly by roll 20 and are urged upwardly around and in a contact with the descending surfaces of the electrodes, as is shown in enlarged scale on Fig. 5. In this manner the portions of the tube blank adjacent to the longitudinal edges are positioned from a short distance in advance of the center line of the electrodes to that center line, just ahead of which welding takes place, in such a manner that the edges are supported and brought into registry with one another, "arcing" and "caving" of the edges is largely avoided, and the current density is kept at a value at which surface burns are avoided. Since the roll 20 may be adjusted both longitudinally and radially of the plug 10, and rolls of several different sizes may be substituted in the carrier depending on the diameters of the blanks, one such device may be adapted for use with blanks of several different diameters, wall thickness and physical strength.

As is better seen in Fig. 3 the roll 20 consists of two side discs 60 and a middle disc 61. Discs 60 are of an outside diameter such that they will engage the inner surface of the tube blank adjacent to the longitudinal edges of the latter while disc 61 is of a smaller diameter and remains out of contact with the inner surface of the tube blank. The particles of metal which are discharged in molten form from the weld and lodge on the outer surface of disc 61 may be chilled, so that they do not adhere tightly to disc 61, by water sprayed thereonto from outlet 52 and these particles may be removed from disc 61 by the cutting tool 40 mentioned above.

It will be noted that insulation 63 is disposed between discs 60 and 61 and that a tubular insulating member 64 extends through discs 60 and 61 and separates these discs from a spool 65 which carries them and which is preferably composed of steel. This spool is provided with a bearing liner 66 which may consist of bronze or other suitable bearing material and which has bearing engagement on axle 21. It will be seen that spool 65 has a flange 67 at one end and a removable ring 68 at the other end. When the discs 60 and 61 and the insulating members 63 and 64 are assembled on the spool, and insulating rings 69 are mounted on the outer sides of disc 60, ring 68 may be secured to spool 65 and these several parts may thus be held in assembled position and out of current conducting contact with each other or with plug 10.

Figure 4:
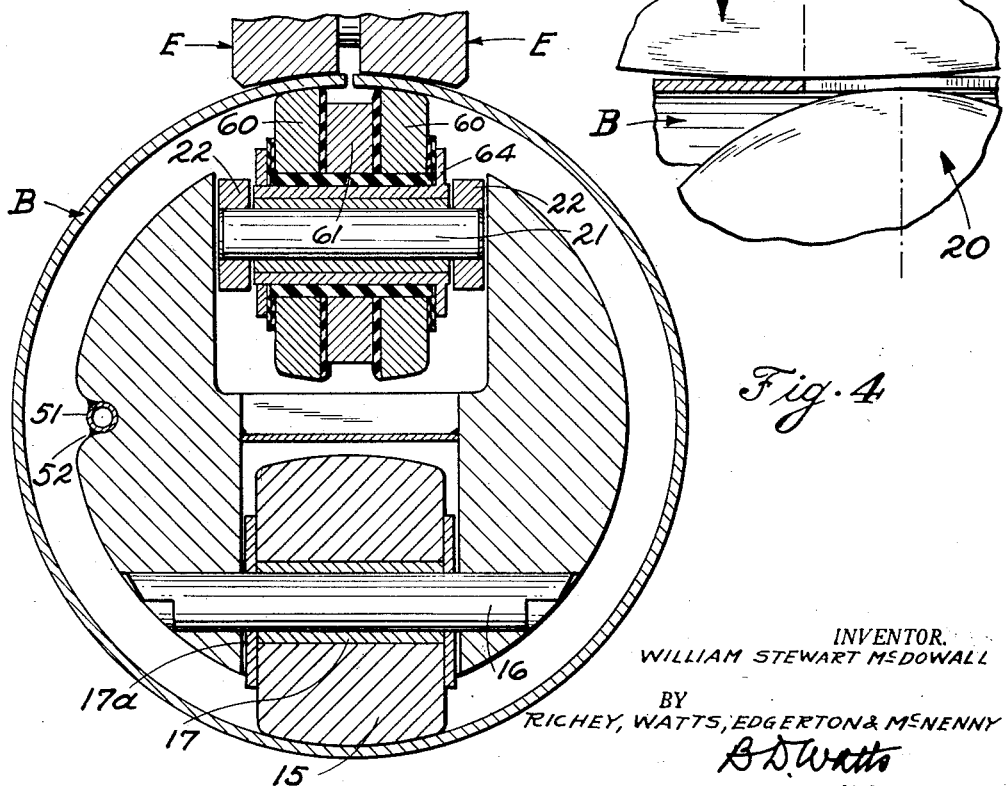
Fig. 4 is a view similar to Fig. 3 but showing the apparatus in a modified form of use with a larger diameter blank.

The modified apparatus of roll 20 shown in Fig. 4 is quite like the device of Fig. 3 but is useable with tube blanks of larger size. For example, the apparatus of Fig. 3 is shown in use with a pipe blank having an outside diameter of 12¾″, while Fig. 4 shows the apparatus in use with a pipe blank 14″ in outside diameter. It will be understood that it is necessary only to replace rolls 15 and 20 in Figs. 2 and 3 with larger rolls for use with pipe blanks of these two widely different sizes. It will also be understood that for pipe sizes between these two illustrated limits it is necessary only to provide rolls of a suitable size to replace rolls 15 and 20. Thus a single device including plug 10 may be used with blanks of various different diameters by the simple expedient of providing rolls like rolls 15 and 20 but of the proper size for any given tube blank diameter and properly adjusting the roll adjacent to the weld as described above. Thus instead of storing a plurality of complete devices to support the inside of the different sized blanks in the welding zone, only three rollers need be provided for each pipe size. The discs 60 are preferably made of high strength alloy steel, heat treated to stand up under the pressures to which they are subjected. Disc 61 is preferably made of copper since the particles of molten metal discharged from the welding zone do not adhere readily to copper. The insulation 63, 64 and 69 may be made of micarta, fiber glass or any other insulating material which will stand up under the service conditions to which it is subjected in the use of the present apparatus.

Having thus described this invention in such full, clear, concise and exact terms as to enable any person skilled in the art to which it pertains to make and use the same, and having set forth the best mode contemplated for carrying out this invention, I state that the subject-matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. In apparatus for resistance welding together the longitudinally extending, opposed edges of an endwise moving tubular blank, the combination of an elongated member disposed in the blank and fixed against longitudinal movement, a roll carrier attached to said member adjacent to the place of welding, a roll supported on one side of the carrier and disposed to engage the blank adjacent to its opposed edges just ahead of the place of welding, means to adjust the position of said roll longitudinally of the carrier, means to adjust the position of said roll radially of the blank, and rolls spaced apart longitudinally on the opposite side of the carrier to engage the inner surface of the blank.

2. In apparatus for resistance welding together the longitudinally extending, opposed edges of an endwise moving tubular blank, the combination of an elongated member disposed in the blank, means projecting from said member between said edges in advance of the place of welding to fix said member agent endwise movement in the blank, a roll carrier attached to said member adjacent to the place of welding, a roll supported on one side of the carrier and disposed to engage the blank adjacent to its opposed edges just ahead of the place of welding, means to adjust the position of said roll longitudinally of the carrier, means to adjust the position of said roll radially of the blank, and rolls spaced apart longitudinally on the opposite side of the carrier to engage the inner surface of the blank.

3. In apparatus for resistance welding together the longitudinally extending, opposed edges of an endwise moving tubular blank, the combination of a pipe disposed in the blank and fixed against longitudinal movement, a roll carrier attached to said pipe adjacent to the place of welding, a roll supported on one side of the carrier and disposed to engage the blank adjacent to its opposed edges just ahead of the place of welding, means to adjust the position of said roll longitudinally of the carrier, means to adjust the position of said roll radially of the blank, a conduit extending from said pipe to beyond said roll and serving to conduct cooling fluid from said pipe and to discharge it against said roll beyond the place of welding, and rolls spaced apart longitudinally on the opposite side of the carrier to engage the inner surface of the blank.

4. In apparatus for resistance welding together the longitudinally extending, opposed edges of an endwise moving tubular blank, the combination of a pipe disposed in the blank and fixed against longitudinal movement, a roll carrier attached to said pipe adjacent to the place of welding, a roll supported on one side of the carrier and disposed to engage the blank adjacent to its opposed edges just ahead of the place of welding, means to adjust the position of said roll longitudinally of the carrier, means to adjust the position of said roll radially of the blank, a conduit leading from said pipe lying in a recess in the side of the carrier, extending to beyond the said roll and projecting forwardly to discharge cooling fluid against said roll beyond the place of welding, and rolls spaced apart longitudinally on the opposite side of the carrier to engage the inner surface of the blank.

5. In apparatus for resistance welding together the longitudinally extending, opposed edges of an endwise moving tubular blank, the combination of an elongated member disposed in the blank and fixed against longitudinal movement, means projecting from said member between said edges in advance of the place of welding to fix said member against endwise movement in the blank, a plug attached to said member adjacent to the place of welding, a roll support on one side of the plug, a roll rotatably carried by said support and disposed to engage the blank just ahead of the place of welding, means to adjust the position of said roll support longitudinally of the plug, means to adjust the position of said roll radially of the blank, and rolls spaced apart longitudinally on the opposite side of the plug to engage the inner surface of the blank, said roll being rotatably mounted on and insulated from an axle and attached to said roll support, said roll comprising side discs to engage the blank adjacent to its opposed edges and a central disc between and insulated from said side discs and of less diameter so as not to engage the inner surface of the blank.

6. In apparatus for resistance welding together the longitudinally extending, opposed edges of an endwise moving tubular blank, the combination of an elongated member disposed in the blank and fixed against longitudinal movement, means projecting from said member between said edges in advance of the place of welding to fix said member against endwise movement in the blank, a plug attached to said member adjacent to the place of welding, a roll support on one side of the plug, a roll rotatably carried by said support and disposed to engage the blank just ahead of the place of welding, means to adjust the position of said roll support longitudinally of the plug, means to adjust the position of said roll radially of the blank, and rolls spaced apart longitudinally on the opposite side of the plug to engage the inner surface of the blank, said roll being rotatably mounted on and insulated from an axle and attached to said roll support, said roll comprising side discs to engage the blank adjacent to its opposed edges, a central disc between said side discs and of less diameter than those discs so as not to engage the inner surface of the blank, and insulating members between said central disc and each side disc, and means for dislodging metal particles discharged from the welding zone into the space between said central disc and said insulating members, said means comprising a tool carried by said carrier and adjustable longitudinally thereof but fixed against transverse pivotal movement, said tool being positioned to project into said space to engage and dislodge said metal particles therein.

References Cited in the file of this patent

UNITED STATES PATENTS

| 1,480,022 | Snodgrass | Jan. 8, 1924 |
| 1,884,466 | Windsor | Oct. 25, 1932 |
| 2,013,517 | Kachel | Sept. 3, 1935 |
| 2,205,002 | Tripp | June 18, 1940 |